US 8,452,580 B2

(12) United States Patent
Strebelle

(10) Patent No.: US 8,452,580 B2
(45) Date of Patent: May 28, 2013

(54) METHOD AND SYSTEM FOR USING MULTIPLE-POINT STATISTICS SIMULATION TO MODEL RESERVOIR PROPERTY TRENDS

(75) Inventor: Sebastien Strebelle, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 475 days.

(21) Appl. No.: 12/713,871

(22) Filed: Feb. 26, 2010

(65) Prior Publication Data

US 2011/0213600 A1 Sep. 1, 2011

(51) Int. Cl.
*G06G 7/48* (2006.01)

(52) U.S. Cl.
USPC .......................................................... 703/10

(58) Field of Classification Search
USPC .......................................................... 703/10
See application file for complete search history.

(56) References Cited

U.S. PATENT DOCUMENTS

| 4,981,037 | A | 1/1991 | Holbrook et al. |
| 5,475,589 | A | 12/1995 | Armitage |
| 5,767,399 | A | 6/1998 | Smith et al. |
| 5,838,634 | A | 11/1998 | Jones et al. |
| 5,999,485 | A | 12/1999 | Anstey et al. |
| 6,035,255 | A | 3/2000 | Murphy et al. |
| 6,044,328 | A | 3/2000 | Murphy et al. |
| 6,070,125 | A | 5/2000 | Murphy et al. |
| 6,295,504 | B1 | 9/2001 | Ye et al. |
| 6,438,493 | B1 | 8/2002 | West et al. |
| 6,477,469 | B2 | 11/2002 | Ye et al. |
| 6,480,790 | B1 | 11/2002 | Calvert et al. |
| 6,560,540 | B2 | 5/2003 | West et al. |
| 7,516,055 | B2 | 4/2009 | Strebelle |
| 2002/0042677 | A1 | 4/2002 | West et al. |
| 2002/0183932 | A1 | 12/2002 | West et al. |
| 2004/0008891 | A1 | 1/2004 | Wentland et al. |
| 2004/0068378 | A1 | 4/2004 | Schuette |
| 2004/0210547 | A1 | 10/2004 | Wentland et al. |
| 2006/0041409 | A1 | 2/2006 | Strebelle et al. |
| 2006/0041410 | A1* | 2/2006 | Strebelle .......................... 703/10 |
| 2007/0014435 | A1 | 1/2007 | Mirowski et al. |
| 2008/0195319 | A1 | 8/2008 | Wilkinson et al. |

OTHER PUBLICATIONS

Deutsch, Clayton V. and Wang, Libing, Hierachical Object-Based Stochastic Modeling of Fluvial Reservoirs, *Mathematical Geology*, vol. 28, No. 7, 1996, 857-880.

Caers, Jef, Strebelle, Sebastien and Payrazyan, Karen, Stochastic Integration of Seismic Data and Geologic Scenarios: A West Africa Submarine Channel Saga, *The Leading Edge*, Mar. 2003.

(Continued)

*Primary Examiner* — Saif Alhija
(74) *Attorney, Agent, or Firm* — Carlos L. Hanze

(57) ABSTRACT

A computer-implemented method and system for simulating reservoir property trends, including petrophysical trends within facies geobodies, is provided. One embodiment includes discretizing a range of values of the reservoir property to be modeled into at least two categories and utilizing the categories to discretize the associated well data and training image into categorical well data and a categorical training image. An embodiment includes applying MPS simulation using the categorical training image on a stratigraphic grid of nodes discretizing the reservoir volume to create a categorical property model. The embodiment additionally includes applying variogram-based simulation in each sub-region of the categorical property model to create a reservoir property model that reproduces the category histogram of each associated sub-region and models the reservoir property trends.

18 Claims, 5 Drawing Sheets

OTHER PUBLICATIONS

Carle, S.F., Use of a Transition Probability/Markov Approach to Improve Geostatistical Simulation of Facies Architecture, *American Association of Petroleum Geologists (AAPG)*, Nov. 1, 2000.

Strebelle, Sebastien, Conditional Simulation of Complex Geological Structures Using Multiple-Point Statistics, *International Association for Mathematical Geology*, vol. 34, No. 1, Jan. 2002.

Caers, Jeff, Avseth, Per and Mukerji, Tapan, Geostatistical Integration of Rock Physics, Seismic Amplitudes and Geological Models in North-Sea Turbidite Systems. *Society of Petroleum Engineers, Inc.*, SPE 71321, SPE Annual Technical Conference and Exhibition, New Orleans, LA, Sep. 30-Oct. 3, 2001.

Strebelle, Sebastien and Journel, Andre G., Reservoir Modeling Using Multiple-Point Statistics, *Society of Petroleum Engineers, Inc.*, SPE 71324, SPE Annual Technical Conference and Exhibition, New Orleans, LA Sep. 30-Oct. 3, 2001.

Strebelle, Sebastien, Payrazyan, Karen, and Caers, Jef, Modeling of a Deepwater Turbidite Reservoir Conditional to Seismic Data Using Multiple-Point Geostatistics, *Society of Petroleum Engineers*, SPE 77425, SPE Annual Technical Conference and Exhibition, San Antonio, TX, Sep. 29-Oct. 2, 2002.

Harding, A., Strebelle, S., Levy, M., Thorne, J., Xie, D., Leigh, S., Preece, R., and Scamman, R. [2004] Reservoir Facies Modeling: New Advances in MPS. Geostatistics Banff 2004, O. Leuangthong and C. Deutsch (eds.), 559-568. Springer.

Arpat, S., and Caers, J. [2004] A Multiple-scale, Pattern-based Approach to Sequential Simulation. Geostatistics Banff 2004, O. Leuangthong and C. Deutsch (eds.), 255-264. Springer.

C. Ravenne et al., Quantification of Facies Relationships Via Proportion Curves, Chapter 2, pp. 19-40, 2002 Kluwer Academic Publishers.

A.G. Journal, Combining Knowledge From Diverse Sources: An Alternative to Traditional Data Independence Hypotheses, Mathematical Geology, Jul. 2002, vol. 34, No. 5, pp. 573-596, International Association for Mathematical Geology, Stanford.

Thomas T. Tran, Improving Variogram Reproduction on Dense Simulation Grids, Computers & Geosciences, 1994, vol. 20, No. 7/8, pp. 1161-1168, Elsevier Science Ltd., Stanford.

Zhang, T., Switzer, P., and Journel, A. [2004] Sequential Conditional Simulation using Classification of Local Training Patterns. Geostatistics Banff 2004, O. Leuangthong and C. Deutsch (eds.), 265-274. Springer.

\* cited by examiner

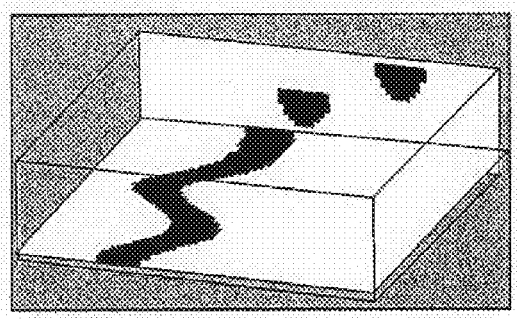
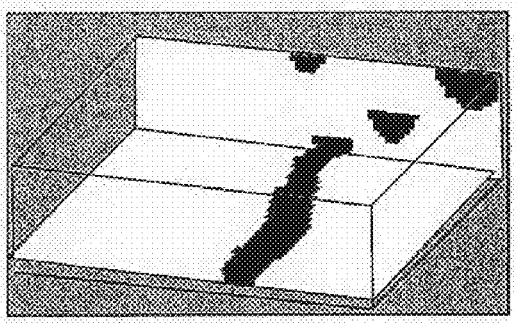
FIG. 3A  FIG. 3B
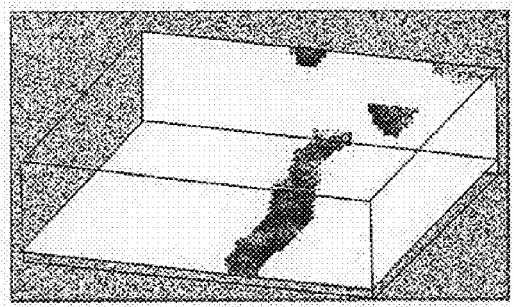
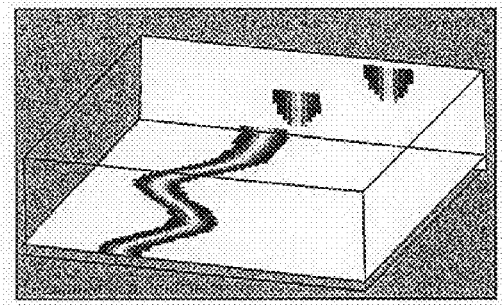
FIG. 4A  FIG. 4B

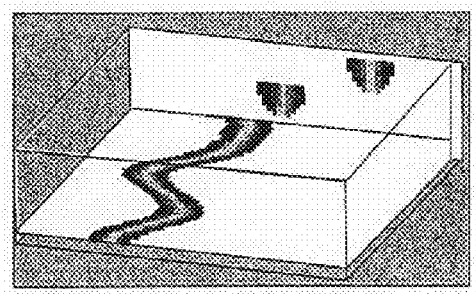
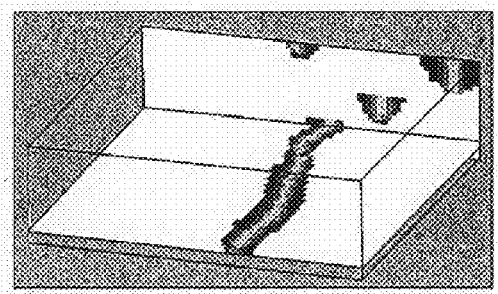
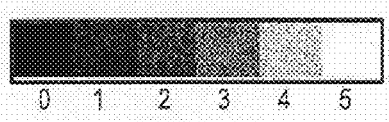
FIG. 5A
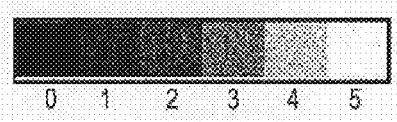
FIG. 5B
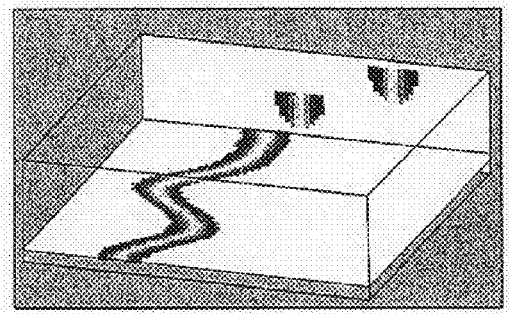
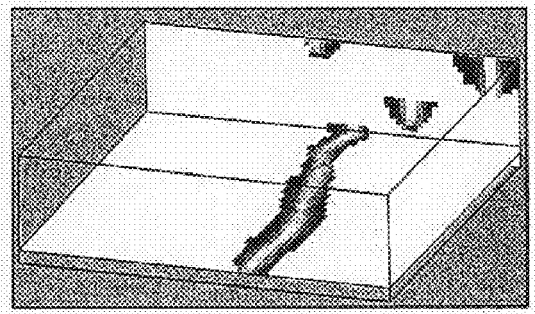
FIG. 6A
FIG. 6B

METHOD AND SYSTEM FOR USING MULTIPLE-POINT STATISTICS SIMULATION TO MODEL RESERVOIR PROPERTY TRENDS

FIELD OF THE INVENTION

The present invention relates generally to the simulation of hydrocarbon reservoirs and specifically to methods and systems for using multiple-point statistics simulation to model reservoir property trends.

BACKGROUND OF THE INVENTION

Multiple-Point Statistics (MPS) simulation is a facies modeling approach that allows simulation of complex geological patterns, such as sinuous channels, that cannot be modeled using conventional geostatistical variogram-based techniques. MPS simulation consists of first extracting patterns from a training image describing the type of facies heterogeneity expected in the reservoir under study, and then reproducing similar patterns conditionally to well and seismic data in the simulation grid.

SNESIM (Single Normal Equation Simulation) is an MPS simulation program that is well known to those skilled in the art of reservoir modeling. Conventional SNESIM is described in Strebelle, S., 2000, Sequential Simulation of Complex Geological Structures Using Multiple-Point Statistics, doctoral thesis, Stanford University, and Strebelle S., 2002, Conditional Simulation of Complex Geological Structures Using Multiple-Point Statistics: Mathematical Geology, V. 34, No. 1. SNESIM is a direct pixel-based sequential algorithm whereby the unsampled nodes of the stratigraphic grid discretizing the reservoir volume of interest are visited a single time along a random path. At each node, the SNESIM simulation program draws a facies value from the local conditional distribution inferred by looking in the training image for patterns matching the conditioning data located in the neighborhood of the node to be simulated. MPS facies models, just like any type of facies models, are then populated with reservoir properties, typically, porosity, permeability, and water saturation, using variogram-based techniques.

Sequential Gaussian Simulation (SGS) is a variogram-based technique traditionally used to simulate reservoir properties. SGSIM, which is described in Deutsch C., and Journel, A. (1998) *GSLIB: Geostatistical Software Library and User's Guide*, second edition, Oxford University Press, is a SGS simulation program that is well known to those skilled in the art of reservoir modeling. SGS, however, as any type of variogram-based technique, does not allow reproducing reservoir property trends, in particular intra-facies geobody trends. Intra-facies geobody petrophysical trends, such as decreasing porosity and permeability from channel axis to channel margins in channelized reservoirs, are commonly observed, and they may have a significant impact on reservoir flow behavior.

This problem, although commonly recognized by reservoir modelers, remains unsolved. In view of the foregoing, a need exists for a method for simulating reservoir property trends, including petrophysical trends within facies geobodies, that addresses the above-identified short comings.

SUMMARY OF THE INVENTION

A computer-implemented method and system for modeling reservoir property trends is provided. The method includes storing in a computer storage devise, well data, sampled from a portion of a reservoir volume of interest and corresponding to a reservoir property to be modeled, and a training image that describes expected trends of the reservoir property; utilizing a computer system having one or more processors configured to communicate with the computer storage device and to execute one or more computer programs configured for performing operations. In one embodiment, the operations include: discretizing a range of values of the reservoir property into at least two categories; discretizing the well data into the categories to create categorical well data, and discretizing the training image into the categories to create a categorical training image; applying multiple-point statistics simulation using the categorical training image on a stratigraphic grid of nodes discretizing the reservoir volume to create a categorical property model conditioned to the categorical well data; creating for each category in the categorical property model, a sub-region having the nodes of the stratigraphic grid where that category has been simulated in the categorical property model; and applying variogram-based simulation in each sub-region to create a reservoir property model that reproduces the category histogram of each associated sub-region and models the reservoir property trends.

It can also be appreciated that at least one additional category of the reservoir property is created if the reservoir property is in a specific facies. The additional category corresponds to the reservoir property values outside the specific facies and is utilized in some embodiments as conditioning data for the MPS simulation in addition to the categorical well data to provide information about facies boundaries for simulating the intra-facies reservoir property trends.

In another embodiment of the present invention includes a computer system configured to model reservoir property trends. The system includes a computer storage device for storing well data, sampled from a portion of a reservoir volume of interest and corresponding to a reservoir property, and a training image that describes expected trends of the reservoir property; a graphical user interface having a user input device and a display device, configured and arranged to display at least one model of reservoir property trends; and at least one processor, configured to communicate with the computer storage device and execute one or more computer programs configured for performing operations including: discretizing a range of values of the reservoir property to be modeled into at least two categories; discretizing the well data into the categories to create categorical well data, and discretizing the training image into the categories to create a categorical training image; applying multiple-point statistics simulation using the categorical training image on a stratigraphic grid of nodes discretizing the reservoir volume to create a categorical property model conditioned to the categorical well data; creating for each category in the categorical property model, a sub-region having the nodes of the stratigraphic grid where that category has been simulated in the categorical property model; and applying variogram-based simulation in each sub-region to create a reservoir property model that reproduces the category histogram of each associated sub-region and models the reservoir property trends.

Another embodiment of the present invention includes a computer-implemented model of reservoir property trends, assembled in accordance with the following operations: storing in a computer storage device, well data, sampled from a portion of a reservoir volume of interest and corresponding to a reservoir property to be modeled, and a training image that describes expected trends of the reservoir property; utilizing a computer system having one or more processors configured to communicate with the computer storage device and execute one or more computer programs configured for performing operations including: discretizing a range of values of the reservoir property to be modeled into at least two categories; discretizing the well data into the categories to create categorical well data, and discretizing the training image into the categories to create a categorical training image; applying multiple-point statistics simulation using the categorical training image on a stratigraphic grid of nodes discretizing the reservoir volume to create a categorical property model conditioned to the categorical well data; creating for each category in the categorical property model, a sub-region having the nodes of the stratigraphic grid where that category has been simulated in the categorical property model; and applying variogram-based simulation in each sub-region to create a reservoir property model that reproduces the category histogram of each associated sub-region and models the reservoir property trends.

The foregoing has outlined rather broadly the features of the present invention in order that the detailed description of the invention that follows may be better understood. Additional features and advantages of the invention will be described hereinafter which form the subject of the claims of the invention.

BRIEF DESCRIPTION OF THE DRAWINGS

These and other objects, features and advantages of the present invention will become better understood with regard to the following description, pending claims and accompanying drawings where:

FIGS. 3A and 3B illustrate a 3D channel simulation in accordance with one or more embodiments of the present invention;

FIGS. 4A and 4B illustrate a 3D porosity simulation within channels in accordance with one or more embodiments of the present invention;

FIGS. 5A and 5B illustrate a 3D categorical porosity simulation within channels in accordance with one or more embodiments of the present invention;

FIGS. 6A and 6B illustrate a 3D porosity simulation within the channel facies in accordance with one or more embodiments of the present invention.

DETAILED DESCRIPTION OF THE INVENTION

Figure 1:
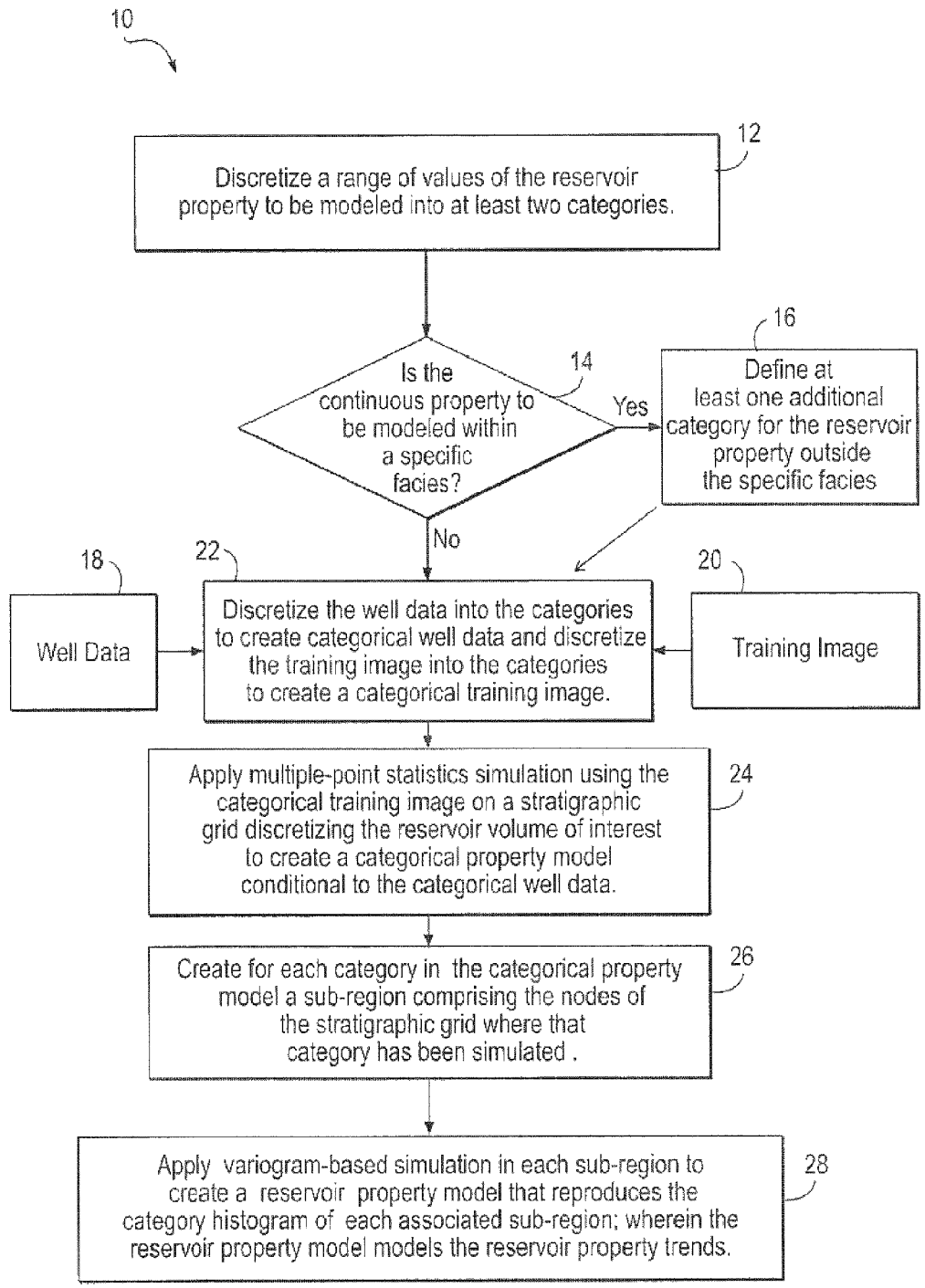
FIG. 1 illustrates a method of using MPS simulation to model reservoir property trends in accordance with one or more embodiments of the present invention.

The present invention may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present invention may be coded in different languages for application in a variety of computing platforms and environments. It will be appreciated that the scope and underlying principles of the present invention are not limited to any particular computer software technology.

Moreover, those skilled in the art will appreciate that the present invention may be practiced using any one or combination of hardware and software configurations, including but not limited to a system having single and/or multi-processor computer processors system, hand-held devices, programmable consumer electronics, mini-computers, mainframe computers, and the like. The invention may also be practiced in distributed computing environments where tasks are performed by servers or other processing devices that are linked through one or more data communications networks. In a distributed computing environment, program modules may be located in both local and remote computer storage media including memory storage devices.

Also, an article of manufacture for use with a computer processor, such as a CD, pre-recorded disk or other equivalent devices, may include a computer program storage medium and program means recorded thereon for directing the computer processor to facilitate the implementation and practice of the present invention. Such devices and articles of manufacture also fall within the spirit and scope of the present invention.

Referring now to the drawings, embodiments of the present invention will be described. The invention can be implemented in numerous ways, including for example as a system (including a computer processing system), a method (including a computer-implemented method), an apparatus, a computer readable medium, a computer program product, a graphical user interface, a web portal, or a data structure tangibly fixed in a computer readable memory. Several embodiments of the present invention are discussed below. The appended drawings illustrate only typical embodiments of the present invention and therefore are not to be considered limiting of its scope and breadth.

FIG. 1 illustrates a method 10 for modeling reservoir property trends, including petrophysical trends within facies geobodies. The operations of method 10 presented below are intended to be illustrative. In some embodiments, method 10 may be accomplished with one or more additional operations not described, and/or without one or more of the operations discussed. Additionally, the order in which the operations of method 10 are illustrated in FIG. 1 and described below is not intended to be limiting.

As shown in FIG. 1, method 10 includes an operation 12, wherein cut-offs are determined to discretize or transform a range of values of the reservoir property to be modeled into at least two categories. The reservoir property to be modeled is usually a reservoir petrophysical property, for example: porosity, permeability, or water saturation. As an example, the range of the reservoir property Z can be discretized into a number K of categories using K−1 cut-offs $z_k$, k=1 ... K−1. The number of cut-offs can be set by a reservoir modeler to divide the reservoir property distribution into equiprobable bins, or the cut-offs can be determined based on modes observed or interpreted from the property histogram, or based on spatial features. Nominally, the number of categories created may vary between 3 and 10.

Figure 2:
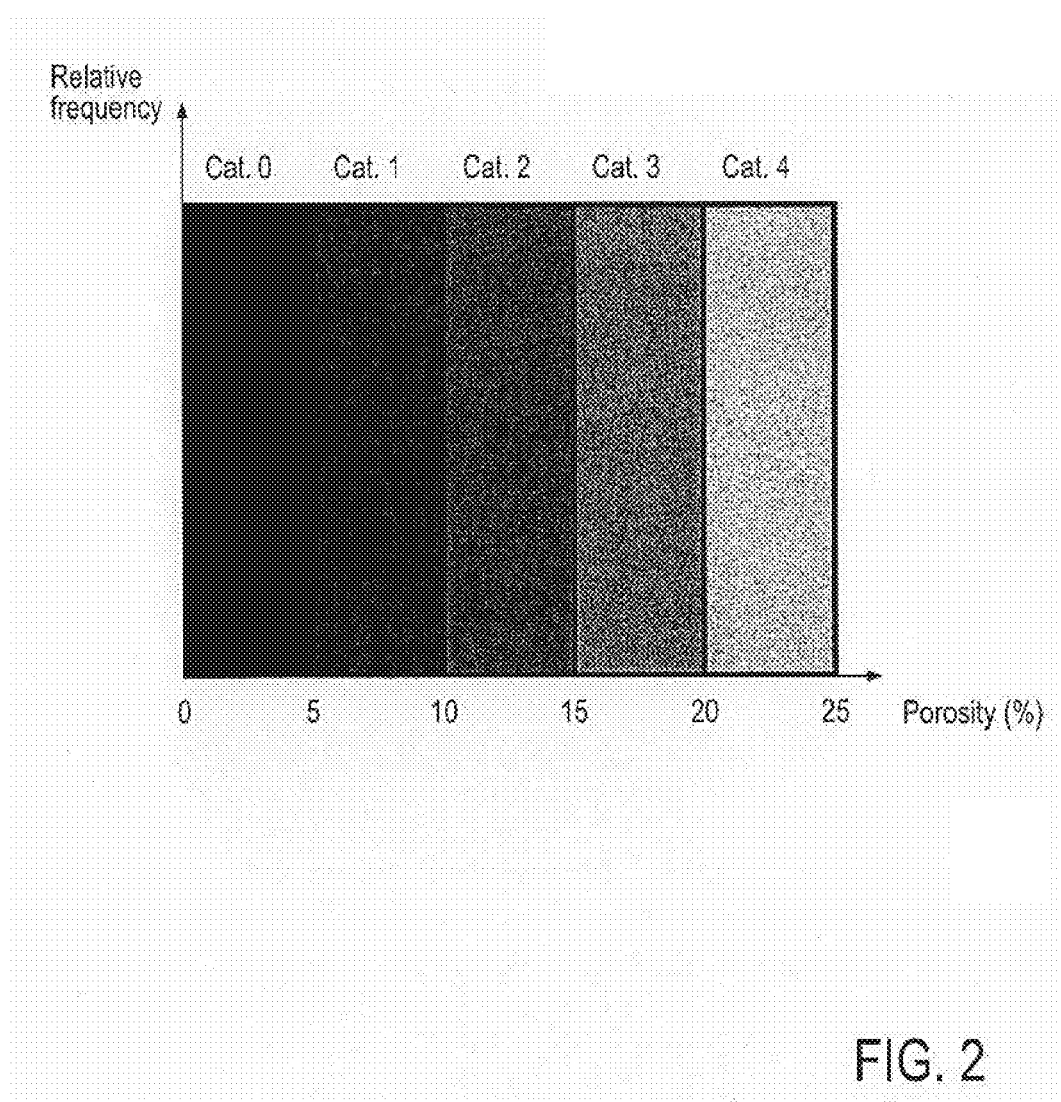
FIG. 2 illustrates a discretization of a range of reservoir property values into categories in accordance with one or more embodiments of the present invention.

FIG. 2 illustrates a discretization of a range of reservoir property values into categories in accordance with one or more embodiments of the present invention. As an example, FIG. 2 shows the discretization of a range of a porosity uniform distribution into five equiprobable categories. The porosity values vary uniformly from 0 to 25%. Five equiprobable categories are created using the porosity histogram quintiles: category 0 corresponds to porosity values ranging from 0 to 5%, category 1 corresponds to porosity values ranging from 5 to 10%, category 2 corresponds to porosity values ranging from 10 to 15%, category 3 corresponds to porosity values ranging from 15 to 20%, and category 4 corresponds to porosity values ranging from 20 to 25%.

Optionally, at operation 14, if the reservoir property is to be modeled in a specific facies (depositional facies or rock type), at least one additional category for the reservoir property can be created at operation 16. The additional category(ies) will correspond to the reservoir property values in any facies other than the facies within which the reservoir property will be modeled. In some embodiments, the additional category is not simulated, but provides information about facies boundaries for conditioning the intra-facies petrophysical trend.

At operation 22, method 10 includes using the categories previously selected at operation 12 to discretize the well data 18, corresponding to the reservoir property to be modeled, into categorical well data, and a training image 20, that describes the heterogeneity patterns/trends expected to be observed in the subsurface for the reservoir property, into a categorical training image. The well data 18 are well known to those skilled in the art and are typically provided by a formation evaluation specialist using an equation transforming well log data, for example gamma ray data, into the reservoir property of interest. Likewise, training image(s) 20 are well known to those skilled in the art and are typically generated by a modeler based on observations from analogs and geological interpretation of the reservoir well and core data.

At operation 24, MPS simulation is applied to the categorical training image on a stratigraphic grid of nodes discretizing the reservoir volume to create a categorical property model conditioned to the categorical well data. In accordance with one or more embodiments of the present invention, a MPS program, such as SNESIM, can be used to create the categorical property model. SNESIM can be used to model any kind of categorical property, i.e. any property S that takes a limited finite number K of values or states, for example, let $s_k$, k=1 . . . K, be the K different states that the property S can take. SNESIM simulation is performed on a stratigraphic grid of nodes that discretizes the reservoir volume of interest. The SNESIM programs a pixel-based sequential simulation technique, i.e., all simulation grid nodes are visited only once along a random path and simulated node values become conditioning data for nodes visited later in the sequence. At each unsampled node u, let $d_n$ be the data event defined by the n closest conditioning data $S(u_1)=s(u_1) \ldots S(u_n)=s(u_n)$, which may be the original well or previously simulated node values. The probability that the node u be in state $s_k$ given $d_n$ may be estimated using Bayes' relation shown as Equation (1):

$$Prob\{S(u) = s_k \mid d_n\} = \frac{Prob\{S(u) = s_k \text{ and } d_n\}}{Prob\{d_n\}} \quad (1)$$

Where $Prob\{S(u)=s_k$ and $d_n\}$ and $Prob\{d_n\}$ are MPS moments that can be inferred from a training image describing the type of geological patterns to be simulated:

1. $Prob\{d_n\}=c(d_n)/N_{TI}$, where $N_{TI}$ is the size of the training image, and $c(d_n)$ is the number of replicates of the conditioning data event $d_n$ that can be found in the training image. Replicates means training data events that have the same geometrical configuration and the same data values as $d_n$.
2. $Prob\{S(u)=s_k$ and $d_n\}=c_k(d_n)/N_{TI}$, where $c_k(d_n)$ is the number of training replicates, among the $c(d_n)$ previous ones, associated to a central value S(u) in state $s_k$.

The conditional probability of occurrence of state $s_k$ at location u is then identified as the proportion of state $s_k$ among the central values of the training $d_n$—replicates shown as Equation (2):

$$Prob\{S(u)=s_k \mid d_n\}=c_k(d_n)/c(d_n) \quad (2)$$

Instead of scanning the training image at each unsampled node to infer the local facies probability function according to Eq. (2), a MPS simulation program, such as SNESIM, can use a dynamic data structure called a search tree to store all the MPS moments that can be inferred from the training image for a given conditioning data neighborhood, or data template.

A conventional multiple-grid MPS simulation program utilizing a search tree is further described in U.S. Pat. No. 7,516,055, Multiple-Point Statistics (MPS) Simulation with Enhanced Computational Efficiency, which is owned by the assignee of the present patent application and is hereby incorporated by reference in its entirety. As detailed in U.S. Pat. No. 7,516,055, a stratigraphic grid of nodes is created, which is to be used to model a reservoir of interest. A training image is created, which reflects a modeler's conceptualization of the stratigraphic patterns and heterogeneities that may be present in the reservoir. In order to capture a broad overview of the reservoir and to limit the number of nodes in computations, an initial coarse grid of nodes is selected which corresponds to the stratigraphic grid. Attributes, i.e. facies values, are then simulated using well data and the training image. Preferably, these attributes are simulated using the MPS simulation steps to be described in greater detail below.

After determining these initial attributes at the coarse grid, the grid is refined by adding additional nodes into the grid. This finer grid, or working grid, includes the nodes for which the attributes were previously simulated. These nodes are referred to as informed nodes as attributes have been assigned. The informed node may include known well data or be simulated values. The additional nodes added to the working grid for which attributes are not yet known are called uninformed nodes.

A data template of nodes is then selected from this refined working grid of nodes. The training image is then scanned using the data template to create a search tree. The attributes of the uninformed nodes are then sequentially determined from the search tree. Using an intermediary sub-grid to decrease the size of the data search template, and/or a data template preferentially constituted by previously simulated nodes, in the multiple-grid simulation allows significant savings in memory and cpu-time.

The working grid is then checked to see whether its fineness matches that of the stratigraphic grid. If yes, then all of the nodes have been assigned attributes. If not, then the fineness of the working grid is enhanced and attributes of additional uninformed nodes are determined by repeating operations above until the working grid matches the stratigraphic grid in number with all attributes, such as facies type, having been determined.

FIGS. 3A and 3B illustrate an example of 3D simulation of channel facies within which porosity trends are to be modeled: 3A illustrates a channel facies training image; and 3B illustrates a MPS channel facies model, in accordance with one or more embodiments of the present invention. The figures illustrate the channel simulations in a horizontal layer and vertical cross-section. The 3D training image shown in FIG. 3A was generated using an unconditional object-based technique, which is a well known modeling technique to those skilled in the art. The training image depicts 3D sinuous channels expected to be similar in terms of dimensions and orientation to the channels in the reservoir volume of interest.

A stratigraphic grid of nodes has been created to discretize the reservoir volume of interest into 70×70×20 nodes. The corresponding MPS simulated realization performed on that grid and shown in FIG. 3B reproduces the channel patterns of the training image.

The use of a MPS facies model in this example is purely illustrative. Neither the use of a facies model, nor the use of MPS simulation for creating such facies model, is required by the present invention. The present invention can be applied to model reservoir property trends without a facies model, or within a facies model created using any facies modeling technique, including object-based technique or variogram-based techniques, such as SIS (Sequential Indicator Simulation), that are well known modeling techniques to those skilled in the art.

SGS is a variogram-based technique commonly used to simulate reservoir properties. SGSIM is a SGS simulation program, that is particularly well known to those skilled in the art of reservoir property modeling. However, just like any variogram-based simulation technique, SGS fails to model reservoir property trends such as complex porosity/permeability heterogeneity patterns and decreasing or increasing property trends from channel axis to channel margins. Yet, such reservoir property trends may have a significant impact on reservoir flow behavior.

As an example, FIGS. 4A and 4B illustrate a 3D porosity simulation within channels: FIG. 4A illustrates a SGS porosity model; and FIG. 4B illustrates a conceptual geological model of the expected porosity trends within the channels, in accordance with one or more embodiments of the present invention. FIGS. 4A and 4B show a comparison of the porosity model in FIG. 4A obtained using SGS within the channels of FIG. 3B, to the conceptual geological model of the expected porosity trends for the channel shown in 4B. The porosity trend in the conceptual geological model, in this case a decreasing porosity transversal trend from channel axis to channel margins, was generated by applying a linear function, with a stochastic component, to the stratigraphic coordinates of the training image channels in FIG. 3A, followed by a histogram transformation to reproduce the global uniform distribution of porosity between 0 and 25% shown in FIG. 2. The SGS model in FIG. 4A reproduces the porosity uniform distribution, and porosity variogram (a spherical variogram with a maximum range of 10 cells along the channels main orientation, a minimum range of 5 cells, and a vertical range of 6 cells, that was inferred in this example from the conceptual geological porosity model of FIG. 4B). However, the transversal porosity trend of the conceptual geological porosity model in FIG. 4B is not captured in the conventional SGS porosity model in FIG. 4A.

Referring back to FIG. 1, at operation 24, any described MPS simulation program, including for example, SNESIM or the MPS program described in U.S. Pat. No. 7,516,055, can be used in accordance with one or more embodiments of the present invention. The target category proportions for the categorical property model are the category proportions obtained after discretizing the range/distribution of values of the reservoir property at operation 12.

When it is determined at operation 14, in some embodiments, that the reservoir property is to be simulated within a specific facies, then MPS programs are modified to consider the additional category(ies) created at operation 16 as follows:

1. Prior to the MPS simulation, all the grid nodes that are outside the specific facies where the reservoir property is to be simulated, are assigned to one of the additional category(ies), and then used as conditioning data for the MPS simulation in addition to the categorical well data. Those additional conditioning data corresponding to the additional category(ies) provide information about facies boundaries for simulating the intra-facies petrophysical trend.
2. In some embodiments, the additional category(ies) are not simulated within the specific facies where the reservoir property is to be simulated and the initial categories determined at operation 12 can be simulated.

As an example, FIGS. 5A and 5B illustrate a 3D categorical porosity simulation within channels: 5A illustrates a categorical training image; and 5B illustrates a MPS categorical porosity model, in accordance with one or more embodiments of the present invention. FIG. 5A shows the categorical training image obtained after discretizing the range of porosity (a uniform distribution between 0 and 25%), from the conceptual model of FIG. 4B using the five (5) equiprobable categories (0 to 4) shown in FIG. 2. Because in this example the continuous property, in this case porosity, is to be modeled within the channel facies geobodies only, an additional sixth category (not shown in FIG. 2) was added to represent porosity outside the channel facies geobodies, which is in this example very low porosity background mud. Note the close similarity between FIGS. 4B and 5A, which shows that five categories is sufficient in this case study to capture the intra-channel porosity heterogeneity, which is in this example a decreasing porosity transversal trend from channel axis to channel margins.

FIG. 5B displays the corresponding categorical property model simulated realization of porosity categories obtained by applying MPS simulation program within the simulated channels of the FIG. 3B. The simulation was performed using the categorical porosity training image of FIG. 5A. In this non-limiting example, categories 0 to 4 are simulated within the channel facies geobodies; category 5, which was added to represent porosity outside the channels is not simulated. Since quintiles were used to discretize the porosity distribution into five (5) equiprobable categories at operation 12, the target category proportions in the MPS categorical property model are nominally 0.2 for each category. The spatial distribution of the facies categories in the categorical porosity training image is well reproduced in the categorical property MPS model.

At operation 26 of FIG. 1, sub-regions are created in the stratigraphic grid from the MPS categorical property model created at operation 24. In some embodiments, one sub-region per category is created. For each category, the sub-region includes the nodes of the stratigraphic grid where the category has been simulated in the MPS categorical property model.

At operation 28 of FIG. 1, a variogram-based simulation approach is applied in each sub-region to create a reservoir property model that reproduces the category histogram of each associated sub-region; wherein the reservoir property model models the reservoir property trends.

The variogram-based simulation approach is typically Sequential Gaussian Simulation (SGS), which is well known to those skilled in the art of reservoir modeling. SGS is a pixel-based sequential simulation technique, whereby the unsampled nodes of the stratigraphic grid discretizing the reservoir volume of interest are visited one single time along a random path. At each node visited along the random path, SGS consists of the following steps:

1. Search for the closest conditioning data (well data and previously simulated nodes);
2. Compute a local conditional probability distribution with kriging using a variogram that models the spatial continuity of the reservoir property to be modeled; and 3. Draw, in some embodiments using Monte-Carlo, a value from the local conditional probability distribution, and assign that value to the node; that simulated value will be used to condition the simulation of nodes visited later along the random path.

SGS requires as an input a target histogram to be reproduced by the reservoir property model. That target histogram is used to, first transform the original well data into normal score data prior to the simulation, and then back transform the simulated normal score values to reproduce the original target histogram.

In each sub-region created from the categorical property model, the target property histogram used to perform SGS is the distribution of reservoir property values corresponding to the category associated with the sub-region. The variogram can be inferred from the conceptual geological property model, as a whole, or category by category (i.e. by inferring the variogram only from the property values corresponding to the category associated with the sub-region being simulated).

In some embodiments, to ensure continuity across sub-region boundaries, the SGS simulations performed for the different sub-regions are run simultaneously, and well data and previously simulated nodes from any sub-region are used to simulate nodes in other sub-regions. The random path is generated to visit all the nodes in all sub-regions, by way of non-limiting example, each node visited along the random path is simulated as follows:
1. Search for the closest conditioning data (well data and previously simulated nodes). For conditioning data located in sub-regions different from the node being simulated, a normal score transform is performed using the target property histogram of the sub-region where the node being simulated is located.
2. Compute a local conditional probability distribution, in some embodiments with kriging using the variogram model of the sub-region where the node being simulated is located; and
3. Draw, in some embodiments using Monte-Carlo, a value from the local conditional probability distribution, and assign the value to the node; that simulated value can be used to condition the simulation of nodes visited later along the random path.

FIGS. 6A and 6B illustrate a 3D property simulation within channels: 6A illustrates a reservoir property training image; and 6B illustrates a continuous MPS property model, in accordance with one or more embodiments of the present invention. Specifically, FIG. 6B shows a reservoir property model of porosity in this case, obtained by creating sub-regions from the MPS categorical porosity model of FIG. 5B, and then running SGS in each sub-region. In each sub-region, the target histogram corresponds to the distribution of reservoir property values corresponding to the category associated with the sub-region. In this case, where five (5) equiprobable categories were defined from the uniform distribution shown in FIG. 2 ranging from 0 to 25% porosity, the target histograms correspond to uniform porosity distributions that range from 0 to 5% for category 0, from 5 to 10% for category 1, from 10 to 15% for category 2, from 15 to 20% for category 3, and from 20 to 5% for category 4. The variogram, a spherical structure with a maximum range of the (10) cells along the channels main orientation, a minimum range of five (5) cells, and a vertical range of six (6) cells, was inferred from the whole conceptual geological porosity conceptual model of FIG. 4B, which is displayed again in FIG. 6A for comparison with the reservoir property model. The transverse porosity trend within the channels is very well reproduced.

Figure 7:
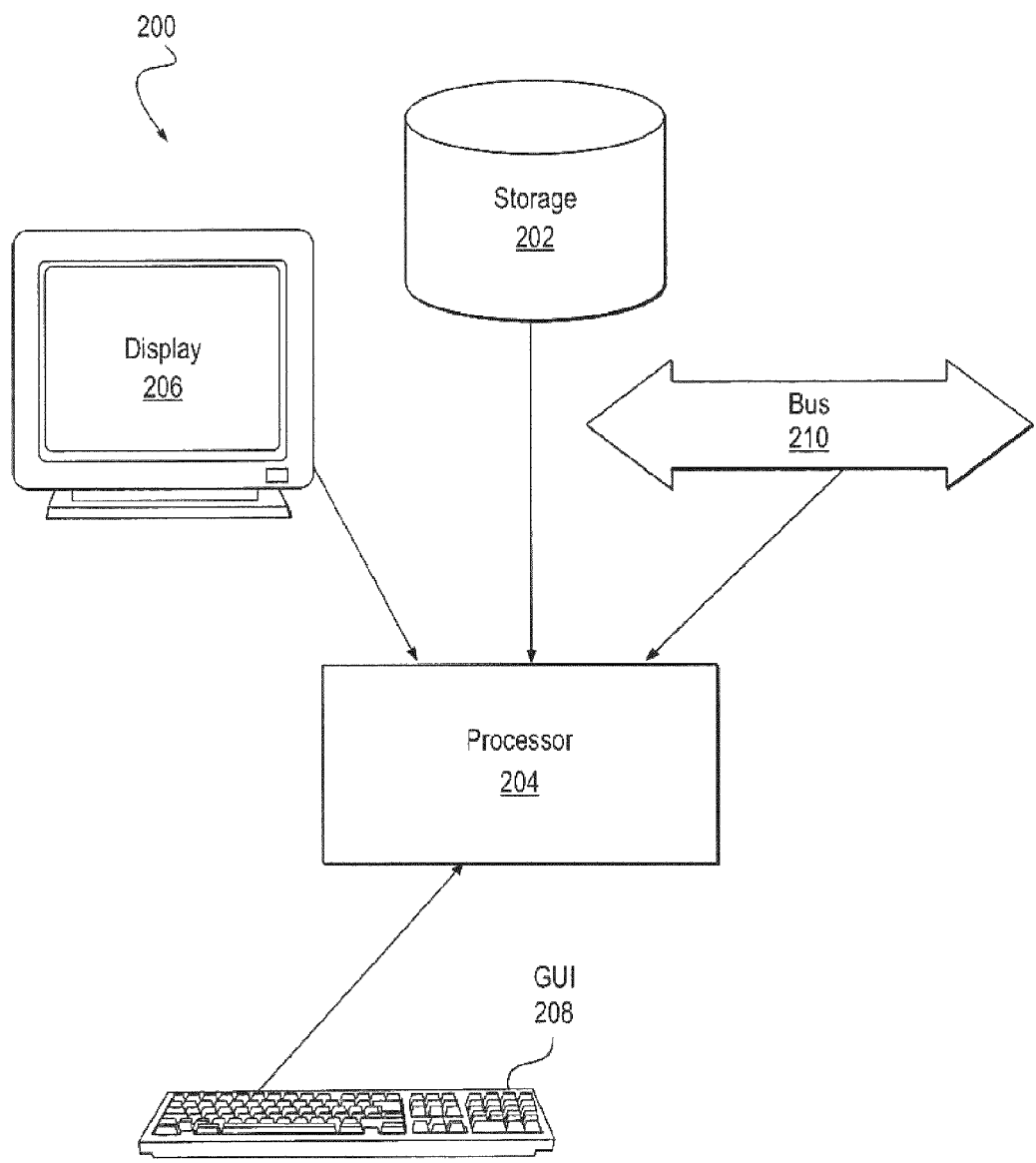
FIG. 7 illustrates a computer system for performing methods in accordance with one or more embodiments of the invention.

FIG. 7 illustrates a computer system 200 for performing method 10 of FIG. 1 in accordance with one or more embodiments of the invention. The computer system 200 includes an electronic storage media, at least one data storage device and/or memory 202. The stored data may be made available to at least one processor 204, such as a programmable general purpose computer or other procession device. The processor 204 may include interface components such as at least one display 206 and at least one graphical user interface 208. The graphical user interface may be used both to display data and processed data products and to allow the user to select among options for implementing aspects of the method 10 of FIG. 1. Data may be transferred to the system 200 via a bus 210 either directly from a data acquisition device, or from an intermediate storage or processing facility (not shown).

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention. All patents and publications referenced herein are hereby incorporated by reference to the extent not inconsistent herewith.

What is claimed is:

1. A computer-implemented method for modeling reservoir property trends, the method comprising:
    storing in a computer storage device, well data, sampled from a portion of a reservoir volume of interest and corresponding to a reservoir property to be modeled, and a training image that describes expected trends of the reservoir property;
    utilizing a computer system having one or more processors configured to communicate with the computer storage device and execute one or more computer programs configured for performing operations comprising:
        discretizing a range of values of the reservoir property into at least two categories;
        discretizing the well data into the categories to create categorical well data, and discretizing the training image into the categories to create a categorical training image,
        applying a multiple-point statistics simulation using the categorical training image on a stratigraphic grid of nodes discretizing the reservoir volume to create a categorical property model conditioned to the categorical well data;
        creating for each category in the categorical property model, a sub-region comprising the nodes of the stratigraphic grid where that category has been simulated in the categorical property model; and
        applying variogram-based simulation in each sub-region to create a reservoir property model that reproduces a category histogram of each associated sub-region and models the reservoir property trends.

2. The method of claim 1, wherein the well data is derived from well log data sampled from the reservoir volume and corresponds to a reservoir property to be modeled.

3. The method of claim 1, wherein the training image is created from reservoir analogs and/or geological interpretation of the reservoir well data and core data.

4. The method of claim 1, wherein the reservoir property to be modeled is a petrophysical property.

5. The method of claim 1, wherein the number of categories divide the reservoir property distribution into equiprobable categories of reservoir property values.

6. The method of claim 1, wherein the number of categories is determined based on modes interpreted from a histogram of the reservoir property.

7. The method of claim 1, wherein at least one additional category of the reservoir property is created if the reservoir property is to be modeled in a specific facies.

8. The method of claim 7, wherein the at least one additional category corresponds to the reservoir property values outside the specific facies.

9. The method of claim 8, wherein the at least one additional category is used as conditioning data for the MPS simulation in addition to the categorical well data to provide information about facies boundaries for simulating the intra-facies reservoir property trends.

10. The method of claim 1, wherein the variogram-based simulation utilizes a variogram computed from a conceptual geological reservoir property model.

11. A computer system for modeling reservoir property trends, the system comprising:
- a computer storage device for storing well data, sampled from a portion of a reservoir volume of interest and corresponding to a reservoir property, and a training image that describes expected trends of the reservoir property; and
- at least one processor, configured to communicate with the computer storage device and to execute one or more computer programs configured for performing operations comprising:
  - discretizing a range of values of the reservoir property to be modeled into at least two categories;
  - discretizing the well data into the categories to create categorical well data, and discretizing the training image into the categories to create a categorical training image;
  - applying a multiple-point statistics simulation using the categorical training image on a stratigraphic grid of nodes discretizing the reservoir volume to create a categorical property model conditioned to the categorical well data;
  - creating for each category in the categorical property model, a sub-region comprising the nodes of the stratigraphic grid where that category has been simulated in the categorical property model; and
  - applying variogram-based simulation in each sub-region to create a reservoir property model that reproduces a category histogram of each associated sub-region and models the reservoir property trends.

12. The method of claim 11, further including a graphical user interface comprising a user input device and a display device, configured and arranged to display at least one model of reservoir property trends.

13. The method of claim 11, wherein the reservoir property to be modeled is a petrophysical property.

14. The method of claim 11, wherein at least one additional category of the reservoir property is created if the reservoir property is in a specific facies.

15. The method of claim 14 wherein the additional category corresponds to the reservoir property values outside the specific facies.

16. The method of claim 15 wherein the at least one additional category is used as conditioning data for the MPS simulation in addition to the categorical well data to provide information about facies boundaries for simulating the intra-facies reservoir property trends.

17. A computer-implemented model of reservoir property trends, prepared by a method comprising the operations of:
- storing in a computer storage device, well data, sampled from a portion of a reservoir volume of interest and corresponding to a reservoir property to be modeled, and a training image that describes expected trends of the reservoir property;
- utilizing a computer system comprising one or more processors configured to communicate with the computer storage device and to execute one or more computer programs configured for performing operations comprising:
  - discretizing a range of values of the reservoir property to be modeled into at least two categories;
  - discretizing the well data into the categories to create categorical well data, and discretizing the training image into the categories to create a categorical training image;
  - applying a multiple-point statistics simulation using the categorical training image on a stratigraphic grid of nodes discretizing the reservoir volume to create a categorical property model conditioned to the categorical well data;
  - creating for each category in the categorical property model, a sub-region comprising the nodes of the stratigraphic grid where that category has been simulated in the categorical property model; and
  - applying variogram-based simulation in each sub-region to create a reservoir property model that reproduces a category histogram of each associated sub-region and models the reservoir property trends.

18. An article of manufacture, comprising:
a non-transitory machine-readable storage medium having computer readable program code means embodied therein for modeling reservoir property trends, the computer readable program code means in said article of manufacture comprising:
- computer readable program means for discretizing a range of values of a reservoir property to be modeled into at least two categories;
- computer readable program means for discretizing well data into the categories to create categorical well data, and discretizing a training image into the categories to create a categorical training image;
- computer readable program means for applying a multiple-point statistics simulation using the categorical training image on a stratigraphic grid of nodes discretizing the reservoir volume to create a categorical property model conditioned to the categorical well data;
- computer readable program means for creating for each category in the categorical property model, a sub-region comprising the nodes of the stratigraphic grid where that category has been simulated in the categorical property model; and
- computer readable program means for applying variogram-based simulation in each sub-region to create a reservoir property model that reproduces a category histogram of each associated sub-region and models the reservoir property trends.

* * * * *